2,920,041

WATERFLOODING METHOD OF SECONDARY RECOVERY

Victor G. Meadors, Tulsa, Okla., assignor, by mesne assignments, to Jersey Production Research Company No Drawing. Application July 31, 1957
Serial No. 675,270

7 Claims. (Cl. 252—8.55)

The present invention is broadly concerned with the recovery of oil from subterranean oil reservoirs. More particularly, the invention concerns an improved waterflooding procedure in which viscous water is employed as the displacing fluid. The invention especially relates to a waterflooding method of oil recovery in which soluble sodium silicate is added to the flood water so as to increase the viscosity of the water and thereby increase its oil-displacing efficiency.

It is a well-known practice in the petroleum industry, when an underground oil reservoir lacks sufficient natural oil-driving means to maintain an economical oil production rate, to inject an oil-displacing fluid into the reservoir. Thus, it has been the practice for some time to inject gas or water into one or more injection wells within a reservoir so as to displace oil from the reservoir through one or more production wells. Methods of this type are generically referred to as methods of secondary recovery, and the particular technique of using water is generally described as waterflooding. It is this latter technique—i.e., waterflooding—to which the present invention has particular application.

While conventional waterflooding is effective in obtaining additional oil from subterranean oil reservoirs, it has a number of shortcomings which detract seriously from its value. Foremost among these shortcomings is the tendency of flood water to "finger" through a reservoir and to by-pass substantial portions of the reservoir. In other words, a water drive has a less than perfect "sweep" efficiency in that it does not contact all portions of a reservoir. Furthermore, it does not normally displace as much oil from the portions of a reservoir which it contacts as it is theoretically capable of doing.

The fingering tendency of a waterflood is usually explained by the fact that oil reservoirs possess regions and strata that have different permeabilities. Some of these regions and strata have a greater relative permeability for water than do other portions of a reservoir, with the result that the water flows more readily through these regions and strata. The net result of this condition is an inefficient oil-displacement action on the part of the water.

At this point, it should be noted that crude oils vary greatly in viscosity—some being as low as one or two cps. and some ranging up to 1000 cps. or even more. This information is of interest, since it has been established that waterflooding performs less satisfactorily with viscous crude oils than with relatively non-viscous oils. In other words, the fingering and bypassing tendencies of a water drive are more or less directly related to the ratio of the viscosity of the reservoir oil to the viscosity of the aqueous driving medium.

Also of interest at this point is a mathematical relationship that has been developed in recent years to help explain the behavior of fluids flowing through porous media such as oil reservoirs. When this equation is applied to a waterflooding operation within an oil reservoir, it reads as follows:

$$\frac{M_o}{M_w} = \frac{\mu_w}{\mu_o} \times \frac{K_o}{K_w}$$

where: $M_o$ is the mobility of the oil through the reservoir in question.
$M_w$ is the mobility of water through the reservoir in question.
$\mu_o$ is the viscosity of the driven oil.
$\mu_w$ is the viscosity of the water.
$K_w$ is the relative permeability of the reservoir toward the water.
$K_o$ is the relative permeability of the reservoir toward the oil.

This equation is perhaps best explained by stating that, when the mobility ratio of oil to water within a reservoir is equal to one, the oil and water move through the reservoir with equal ease; and substantially equilibrium proportions of water and oil remain within the reservoir as soon as the water has passed therethrough. Expressed otherwise, the mobility ratio term affords a measure of the volume of water and the amount of time that are required for a waterflood to reduce the oil content of a reservoir to an ultimate equilibrium value. For example, a given volume of flood water operating at a mobility ratio of one will displace a markedly greater volume of oil from a reservoir than will an equal volume of water operating at a mobility ratio of less than one.

The soundness of the above relationship has been borne out—at least to a degree—by the observation that the oil-displacing efficiency of flood water may be materially increased by: (1) increasing the viscosity of the water or (2) decreasing the viscosity of the oil. Generally speaking, the latter of these techniques is the one that has received the more attention to date.

Several attempts have been made thus far in the industry to increase the viscosity of the water used in a waterflooding program. Thus, it has been suggested that materials such as certain natural gums and sugars be employed as water thickeners. While these materials are effective to an extent in increasing the viscosity of flood water, they are also characterized by serious disadvantages. For example, some of these materials have a tendency to plug formations; some are relatively unstable; and some have relatively little thickening effect. Additionally, many of these materials are quite expensive; and their use is not feasible from the standpoint of economics.

Accordingly, it is an object of this invention to provide an improved type of waterflooding process in which a marked increase in the viscosity of water may be readily attained. More particularly, it is an object of the invention to provide a waterflooding process which is especially suited for use in oil reservoirs that contain relatively viscous crude oils—i.e., at least about 10 cps. at the temperature of the reservoir. Thus, it is an especial object of the invention to provide a waterflooding process which is capable of displacing relatively viscous oils from underground reservoirs in a more effective and efficient manner than has been possible heretofore. It is also an object of the invention to provide a viscous waterflooding process in which the increased viscosity of the flood water is attained inexpensively. It is still a further object of the invention to use a flood water whose viscosity is stable and can be adjusted over a wide range.

These and related objects, which will be expressly discussed or readily apparent in the following description, are realized in accordance with this invention by dissolving sodium silicate within a flood water. The sodium silicate may be added to the entire body of water; or, alternatively, it may be added to merely a portion of the water. In the latter event, however, the sodium silicate should be incorporated within the forward portion of the flood. In any case, the silicate should be located within the leading portion of the water drive in order that the effect of the resulting viscosity increase may be fully exploited.

When sodium silicate is added solely to the leading portion of a water drive, the quantity of silicate should be sufficient to prevent the trailing, relatively non-viscous water from breaking through the silicate solution and contacting the reservoir oil directly. The minimum quantity of solution to be used as a bank in any given reservoir will depend upon such well-recognized factors as the flooding pattern, the distance between wells, the viscosity of the oil, etc. In some reservoirs, it is contemplated that the volume of the water containing silicate need not exceed about 15 percent of the pore volume of the reservoir to be contacted by the solution. In most reservoirs, however, it is contemplated that the volume of silicate solution should be at least about 25 percent of the pore volume.

With respect to the quantity of sodium silicate to be employed in a process of this invention, the quantity should be sufficient in all instances to constitute at least about 10 percent by weight of the water to which the silicate is added. It is only when this silicate concentration is approached or exceeded that the viscosity of the water takes on a substantial increase. Concentrations of silicate in excess of the 10 percent value may be used as desired, but it is generally preferred that the viscosity not exceed about 1000 centipoises in any case. Wherever possible and feasible, it is preferred that the viscosity of the silicate solution be adjusted such that the mobility ratio of the solution and the reservoir oil approaches a value of one. It is to be noted that mobility ratios of greater than one return very little in the way of additional oil recoveries; but, at ratios less than one, oil recoveries fall off quite rapidly.

Sodium silicate may be obtained in a wide range of compositions. Generally speaking, the constitution or composition of any particular sodium silicate is generally referred to as its ratio of silica to sodium oxide. In other words, the ratio of silica to alkali is not any fixed quantity; and it may be varied greatly. Accordingly, a wide range of sodium silicate compositions may be used in the practice of this invention; but it is generally preferred to use those silicates which have a relatively high proportion of silica. Silicates containing large proportions of alkali are very alkaline and have an adverse effect upon some earth structures. For example, clay structures—frequently encountered in oil reservoirs—swell greatly in the presence of alkaline materials, with the result that their permeability toward water and oil suffers markedly. In general, it is preferred that silica to alkali molal ratios of at least about 2.4 be used in practicing this invention.

In carrying out the method of the invention, any given reservoir is provided in a conventional manner with a predetermined number of injection wells and production wells. It will be noted at this point that the invention is adaptable to line-drive flooding techniques as well as to techniques that employ five-spot patterns, seven-spot patterns, and the like.

Having prepared the desired number of injection and production wells, the aqueous silicate solution is introduced into the oil reservoir through the injection wells. As noted earlier, the viscosity of the solution is preselected preferably such that the mobility ratio of the solution of the reservoir oil is approximately one. The solution, furthermore, should have a silicate concentration of at least about 10 percent by weight.

When speaking of the viscosities of the silicate solution and the reservoir oil, the viscosities referred to are those existing within the reservoir. The temperature of the reservoir, of course, has a bearing upon these values.

The viscosity of the reservoir oil may be determined in a conventional manner—e.g., by obtaining an actual sample of the oil, or by reconstituting a sample of the oil, and thereafter determining its viscosity value.

The relative permeabilities of the reservoir to oil and to the silicate solution may also be obtained in a conventional manner—e.g., by measurements made on a core sample of the formation.

As mentioned earlier, the silicate solution may be injected as a relatively narrow bank; but it is necessary that the bank be sufficiently large that water breakthrough (i.e., through the bank) may not occur until the reservoir has been traversed by the solution from the injection wells to the production wells. Conventional waterflooding rates may be used—for example, about 0.2 to 2 feet of linear movement through the reservoir per day.

Once the desired volume of solution has been injected into the reservoir, flood water in the form of fresh water, salt water, or the like may be injected as in a conventional waterflooding program. The waterflood is continued until whatever practical amounts of oil have been withdrawn from the reservoir. At this time, the waterflood may be discontinued.

It will be recognized that a number of variations in this procedure may be employed without departing from the spirit or scope of the invention. Thus, it is contemplated that at least a portion of the viscous silicate solution may be withdrawn from the reservoir at various points and recycled or returned to the reservoir at prior points within the reservoir. Any recycled solution should preferably be returned to a later point in the bank of silicate solution, although this is not entirely necessary since beneficial results may be still derived from the recycle operation even though return to the bank itself is not realized.

It is also contemplated that other materials may be added to the thickened silicate solution. For example, it is within the scope of the invention to add surface active agents to the solution. It has been demonstrated in the art that surfactants are quite effective in increasing the oil-begetting properties of a waterflood. A large number of surfactants have been used or suggested for use, and specific identification of these materials in therefore not considered to be a necessary feature of this disclosure. In general, however, non-ionic surfactants are preferred over anionic or cationic ones.

The invention claimed is:

1. In a waterflooding process for recovering oil from a subterranean oil reservoir, the improvement which comprises incorporating at least about 10 weight percent of a soluble sodium silicate within at least the leading portion of the waterflood.

2. A method as defined in claim 1 in which the mobility ratio of the solution to the reservoir oil is approximately one.

3. A method as defined in claim 1 in which the molal ratio of $SiO_2$ to $Na_2O$ within the silicate is at least about 2.4.

4. A process for displacing oil from an oil reservoir which comprises injecting an aqueous sodium silicate solution within the reservoir, said solution having at least about 10 weight percent of silicate therein.

5. A process for displacing oil from a subterranean oil reservoir which comprises injecting an aqueous sodium silicate solution within the reservoir through an input well in a quantity sufficient to displace oil from at least a portion of the reservoir through an output well spaced from the input well, said solution containing at least about 10 weight percent of sodium silicate.

6. A process as defined in claim 5 in which the quantity of solution injected is at least about 25 percent of the pore volume of the reservoir portion contacted by the solution.

7. A process as defined in claim 5 in which the concentration of sodium silicate within the aqueous solution is at least about 10 percent by weight of the solution but less than that required to give the solution a viscosity of about 1000 centipoises.

References Cited in the file of this patent

UNITED STATES PATENTS

| | | |
|---|---|---|
| 2,246,726 | Garrison | June 24, 1941 |
| 2,341,500 | Detling | Feb. 8, 1944 |
| 2,816,610 | Fischer | Dec. 17, 1957 |

FOREIGN PATENTS

| | | |
|---|---|---|
| 163,519 | Great Britain | May 26, 1921 |